United States Patent [19]
Nagase et al.

[11] 3,897,509

[45] July 29, 1975

[54] PREPARATION OF ALKYLIDENE BICYCLIC COMPOUNDS

[75] Inventors: Tsuneyuki Nagase; Gohu Suzukamo; Masami Fukao; Kenichi Nishio, all of Osaka, Japan

[73] Assignee: Sumitomo Chemical Co., Ltd., Osaka, Japan

[22] Filed: Jan. 21, 1974

[21] Appl. No.: 434,996

Related U.S. Application Data

[63] Continuation-in-part of Ser. No. 159,308, July 2, 1971, Pat. No. 3,808,152.

[30] Foreign Application Priority Data

July 2, 1970 Japan.......................... 45-58522
Aug. 18, 1970 Japan.......................... 45-72643
June 5, 1971 Japan.......................... 46-39701

[52] U.S. Cl. .......................................... 260/666 PY
[51] Int. Cl. ............................................. C07c 5/24
[58] Field of Search............................. 260/666 PY

[56] References Cited

UNITED STATES PATENTS

| | | | |
|---|---|---|---|
| 3,347,944 | 10/1967 | Fritz et al. .......................... | 260/666 |
| 3,577,473 | 5/1971 | Nagase et al. ................. | 260/666 PY |

*Primary Examiner*—Veronica O'Keefe
*Attorney, Agent, or Firm*—Stewart and Kolasch, Ltd.

[57] ABSTRACT

Alkylidene bridged ring compounds are produced by contacting an alkenyl bridged ring compound with an alkaline catalyst composition prepared by heating an alkali metal, an alkali metal hydroxide and alumina at a temperature higher than the melting point of the alkali metal.

9 Claims, 1 Drawing Figure

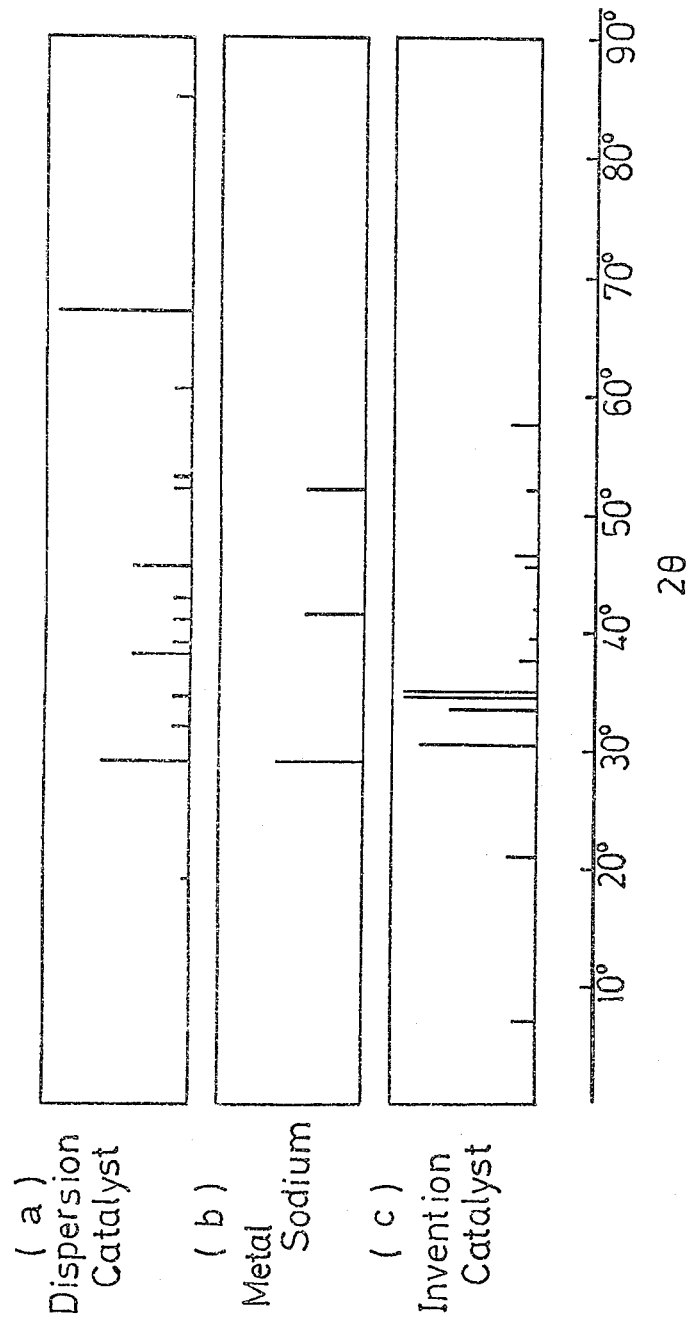

PREPARATION OF ALKYLIDENE BICYCLIC COMPOUNDS

This application is a continuation-in-part application of Ser. No. 159,308, filed on July 2, 1971, now U.S. Pat. No. 3,808,152, issued on Apr. 30, 1974.

The present invention relates to a novel alkaline catalyst composition and its use. More particularly, it relates to a novel alkaline catalyst composition prepared by heating an alkali metal, an alkali metal hydroxide and alumina and its use for the isomerization of alkenyl bridged ring compounds to the corresponding alkylidene bridged ring compounds.

For the reactions which are catalyzed by bases, there are usually employed as the catalyst bases alkali metals and basic alkali metal compounds (e.g. alkali metal hydrides, alkali metal amides, alkali metal hydroxides, and alkyl alkali metals). In the case of alkali metals, their catalytic activity may be often exerted only in an extremely minimized form. In order to obtain such a minimized form, alkali metals have been dispersed on carrier materials having a large surface area such as alumina, silica gel, activated carbon and sodium carbonate [cf. J.Am. Chem.Soc., 82, 387 (1960)]. The thus obtained catalyst compositions (hereinafter referred to as "dispersion catalyst") are highly active in various catalytic reactions, including isomerization of olefins. However, they are easily ignited on exposure to air and react readily with water to generate hydrogen, whereby the catalytic activity is lost. Such unstability is a great disadvantage inherent in the dispersion catalysts of the said type.

It has now been found that heating of an alkali metal, an alkali metal hydroxide and alumina affords a novel alkaline catalyst composition which has an excellent catalytic activity with a long catalytic life. Particularly notable is its high stability to air and water. Thus, the catalyst composition can be handled without any special care in the atmosphere.

It has also been found that the said catalyst composition has an excellent catalytic activity in various chemical reactions, particularly in the isomerization of alkenyl bridged ring compounds to the corresponding alkylidene bridged ring compounds. Thus, it is useful for the production of alkylidene bridged ring compounds such as alkylidenebicyclo[2,2,1]hepta-2-enes which are valuable in the production of synthetic rubber.

Accordingly, it is a basic object of the present invention to embody a novel alkaline catalyst composition of high stability in the atmosphere. Another object of this invention is to embody an alkaline catalyst composition of excellent catalytic activity in the isomerization of alkenyl bridged ring compounds. A further object of the invention is to embody a process for preparing a novel alkaline catalyst composition. A still further object of the invention is to embody a process for producing alkylidene-bridged ring compounds. These and other objects will be apparent to those conversant with the art to which the present invention pertains from the subsequent descriptions.

The catalyst composition of this invention can be prepared by heating an alkali metal, an alkali metal hydroxide and alumina at a temperature higher than the melting point of the alkali metal.

As the alkali metal, there may be used one or more of lithium, sodium, potassium, rubidium and cesium in Group I of the periodic table. These metals may be used in the form of an alloy consisting of two or more kinds of alkali metals. A typical example of such an alloy is sodium-potassium alloy. Examples of the alkali metal hydroxide are hydroxides of lithium, sodium, potassium, rubidium and other metals in Group I of the periodic table. One or more kinds of these hydroxides can be used. The alkali metal hydroxide is not necessarily required to correspond to the said alkali metal. Thus, the combination of the alkali metal and the alkali metal hydroxide to be employed may be, for instance, lithium and lithium hydroxide, sodium and sodium hydroxide, potassium and potassium hydroxide or rubidium and rubidium hydroxide as well as lithium and sodium hydroxide, sodium and potassium hydroxide or lithium and potassium hydroxide.

The alumina may be, for instance, $\alpha$-alumina, -alumina, $\Theta$-alumina, $\delta$-alumina, $\gamma$-alumina, $\eta$-alumina, $\chi$-alumina or $\rho$-alumina. There may also be used an alumina-containing material such as alumina silicate for the source of alumina. Usually, however, the use of alumina itself is much favorable.

The amount of the alkali metal hydroxide with respect to the alumina is not limitative but is normally preferred to be 1/100 (0.01) to 100% by weight. The alkali metal may be employed in an equimolar or less amount, preferably in an equimolar to 1/100 (0.01) molar amount, with respect to the alkali metal hydroxide.

For the preparation of the catalyst composition of the invention, the said materials, i.e., the alkali metal, the alkali metal hydroxide and the alumina, are heated at a temperature higher than the melting point of the alkali metal (preferably from 200° to 500°C), ordinarily in an inert gas such as nitrogen, helium or argon while stirring. The reaction time is associated with the temperature of heating and may be usually from 1 to 30 hours. A higher temperature requires a shorter reaction time.

Practically, the alumina is first heated to a desired temperature and, while maintaining such temperature, the alkali metal and the alkali metal hydroxide are added thereto. Although the order of incorporation of these materials is optional, the order of the alumina, the alkali metal hydroxide and the alkali metal is the most preferred. In this case, the alkali metal hydroxide can be used in the form of an aqueous solution, provided that the water in such a solution is sufficiently removed, usually under reduced pressure, prior to the addition of the alkali metal.

In the above procedure, the preparation of the catalyst composition may be started with the use of the alkali metal and an alumina having water removable therefrom, i.e. without using the alkali metal hydroxide. The term "removable water" hereinabove used is intended to mean not only visible water itself but also crystalline water and hydroxyl groups which can be eliminated in the form of water, inclusively. Thus, the alumina herein utilizable may be any alumina other than $\alpha$-alumina which is considered to include no removable water. The water content in such utilizable alumina may be usually from 1.3 to 15% by weight, favorably from 2.3 to 10% by weight. The alkali metal is employed in an amount larger than that which can consume completely the water in the starting alumina, preferably 1.01 to 2 times the amount which can use up such water.

Actually, the reaction may be carried out by heating the alumina and a whole amount of the alkali metal together or by heating first the alumina with a portion of the alkali metal so as to consume substantially the water in the alumina and, after the addition of the remaining portion of the alkali metal, continuing the heating. In the latter case, the alkali metal which is initially used may be the same as or different from the one employed latter. The reaction temperature and the reaction time may be entirely the same as those mentioned in connection with the procedure using the alkali metal hydroxide.

The said alternative procedure may be understood to be substantially the same as the previous procedure and falling within the scope of this invention, because the reaction is assumed to proceed as follows: a portion of the alkali metal is first reacted with the water removed from the alumina to produce the corresponding alkali metal hydroxide and then the remaining portion of the alkali metal, the produced alkali metal hydroxide and the resultant alumina are reacted with each other.

Different from the conventional dispersion catalyst, the thus obtained catalyst composition does not contain the alkali metal as a simple substance. This is clearly evidenced by the following facts:

1. The catalyst composition of the invention is colored white to grayish white and does not show any pattern attributed to the alkali metal as a simple substance in the X-ray diffraction pattern (cf. FIG. (c) of the attached drawings), whereas the dispersion catalyst is colored violet to black and shows a pattern attributed to the alkali metal as a simple substance in the X-ray diffraction pattern (cf. FIGS. (a) and (b) of the attached drawings). In this connection, it is notable that the active dispersion catalyst shows a color inherent to the alkali metal as a simple substance such as violet black in case of potassium or black in case of sodium and, then when it turns gray, the catalytic activity is lost [J. Chem. Soc., 1967, 2179].

2. When treated with liquid ammonia, the catalyst composition of the invention does not afford any color, whereas the dispersion catalyst exhibits sensitively a dark violet color due to the alkali metal as a simple substance present therein.

Further, the catalyst composition of the invention may be differentiated from the dispersion catalyst in the essential use of the alumina for its preparation. That is the use of any conventional carrier material other than and instead of the alumina in the preparation of the catalyst composition according to the present invention does not provide any composition having an appreciable catalytic activity, while the conventional dispersion catalyst prepared by the use of a conventional carrier material other than alumina such as activated carbon, silica gel or sodium carbonate shows substantially the same activity as the one prepared by the use of alumina.

When the reaction of the alkali metal, the alkali metal hydroxide and the alumina according to this invention is carried out insufficiently and incompletely, the resulting composition may include unreacted alkali metal and exhibit some characteristics due to the same. The catalytic activity of such a composition is inferior to that of the catalyst composition obtained by the complete proceeding of the reaction but still much higher than that of the conventional dispersion catalyst.

As noted above, the catalyst composition of the invention is greatly advantageous with respect to its strong catalytic activity and long catalytic lift and its higher stability to air and water, compared with the conventional dispersion catalysts.

The catalyst composition of the invention is useful, for instance, in the isomerization of alkenyl bridged ring compounds to the corresponding alkylidene bridged ring compounds. Namely, it may be used as the catalyst in the conversion of alkenyl-bridged ring compounds of the formula:

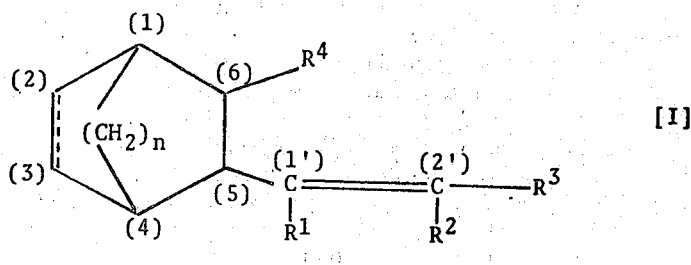

wherein $R^1$, $R^2$ and $R^3$ are each hydrogen or alkyl having 1 to 8 carbon atoms, $R^4$ is hydrogen or alkyl having 1 to 4 carbon atoms, and n is 1 or 2 and wherein a double bond may be present at the place between the 2- and 3-positions as indicated by the dotted line, into the corresponding alkylidene bridged ring compounds of the formula:

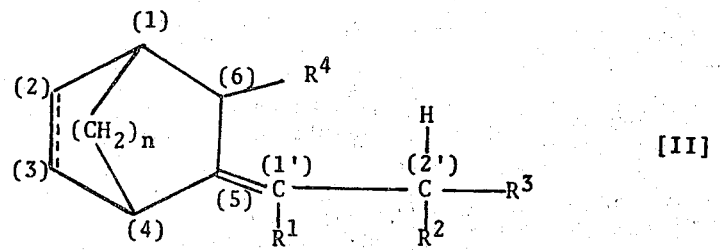

wherein $R^1$, $R^2$, $R^3$, $R^4$ and n are each as defined above and a double bond may be present at the place between the 2- and 3- positions as indicated by the dotted line.

Specific examples of the starting materials, i.e. the compounds [I], are as follows: 5-vinylbicyclo[2,2,1]-heptane; 5-(1'-propenyl)-bicyclo[2,2,1]heptane; 5-(1'-butenyl)-bicyclo-[2,2,1]heptane; 5-isopropylbicyclo[2,2,1]heptane; 5-(2'-methyl-1'-propenyl)-bicyclo[2,2,1]heptane; 6-methyl-5-vinylbicyclo[2,2,1]heptane; 6-methyl-5-isopropenylbicyclo-[2,2,1]heptane; 6-ethyl-5-vinylbicyclo[2,2,1]heptane; 5-vinyl-bicyclo[2,2,1]-hepta-2-ene; 5-(1'-propenyl)-bicyclo[2,2,1]-hepta-2-ene; 5-(1'-butenyl)-bicyclo[2,2,1]hepta-2-ene; 5-isopropenylbicyclo[2,2,1]-hepta-2-ene; 5-(2'-methyl-1-propenyl)-bicyclo[2,2,1]hepta-2-ene; 5-(1'-octenyl)-bicyclo[2,2,1]hepta-2-ene; 6-methyl-5-vinylbicyclo[2,2,1]hepta-2-ene; 6-methyl-5-isopropenylbicyclo[2,2,1]hepta-2-ene; 6-ethyl-5-vinylbicyclo[2,2,1]hepta-2-ene; 5-vinylbicyclo[2,2,2]octane; 5-(1'-propenyl)-bicyclo[2,2,2]octane; 5-isopropenylbicyclo[2,2,2]octane; 5-(1'-butenyl)-bicyclo[2,2,2]octane; 6-methyl-5-vinylbicyclo[2,2,2]octane; 6-methyl-5-isopropenylbicyclo[2,2,2]octane; 5-vinylbicyclo[2,2,2]octa-2-ene; 5-(1'-propenyl)-bicyclo[2,2,2]octa-2-ene; 5-isopropenylbicyclo[2,2,2]octa-2-ene; 5-(1'-butenyl)-bicyclo[2,2,2]octa-2-ene; 5-(1'-butenyl)-bicyclo[2,2,2]octa-2-ene; 5-(2'-methyl-1'-propenyl)-bicyclo[2,2,2]octa-2-ene; 6-methyl-5-vinylbicyclo[2,2,2]octa-2-ene; 6-methyl-5-isopropenylbicyclo[2,2,2]octa-2-ene, etc.

These compounds [I] can be produced by subjecting a cyclic diene such as cyclopentadiene or cyclohexadiene and an aliphatic 1,3-diene to a Diels-Alder reaction or by subjecting the corresponding bridged ring compound bearing a hydroxyl group at the 1'- or 2'-position to dehydration.

Among the compounds [I], those other than 5-alkenylbicyclo[2,2,2]octanes comprise the endo type and the exo type. Both of these types may be equally subjected to the isomerization of this invention.

According to the present invention, the compound [I] is contacted with the said catalyst composition whereby the isomerization takes place to give the compound [II] quantitatively.

Although a specific limitation does not exist on the amount of the catalyst composition to be employed, it is usually employed in an amount of 1/1000 (0.001) to 1 part by weight per 1 part by weight of the starting compound [I]. Particularly preferred is 1/100 (0.01) to 1/5 (0.20) part by weight of the catalyst composition per 1 part by weight of the compound [I].

The isomerization may be effected batchwise or continuously. It is usually effected at room temperature. Heating is not necessarily required and, even if used, does not afford any unfavorable influence on the isomerization. When desired, an appropriate inert solvent such as a hydrocarbon (e.g. pentane, hexane, isopentane, dodecane) or ether (e.g. diethyl ether, tetrahydrofuran, dioxane) may be used. For assuring the complete proceeding of the isomerization, the reaction is favorably effected in an inert gas.

The progress of the isomerization is usually examined by gas chromatographic analysis. Since the reaction proceeds quantitatively with ease, the product is of high purity without applying any purification procedure thereto. If desired, however, it may be purified by a per se conventional procedure such as distillation or chromatography.

The following compounds are some specific examples of the products, i.e. the compounds [II]: 5-ethylidenebicyclo[2,2,1]-heptane; 5-propylidenebicyclo[2,2,1]heptane; 5-butylidenebicyclo[2,2,1]heptane; 5-isopropylidenebicyclo[2,2,1]-heptane; 5-(2-methylpropylidene)-bicyclo[2,2,1]heptane; 6-methyl-5-ethylidenebicyclo[2,2,1]heptane; 6-methyl-5-isopropylidenebicyclo[2,2,1]-heptane; 6-ethyl-5-ethylidenebicyclo[2,2,1]heptane; 5-ethylidenebicyclo[2,2,1]hepta-2-ene; 5-propylidenebicyclo[2,2,1]hepta-2-ene; 5-butylidenebicyclo[2,2,1]hepta-2-ene; 5-isopropylidenebicyclo[2,2,1]hepta-2-ene; 5-(2'-methylpropylidene)bicyclo[2,2,1]-hepta-2-ene; 5-octylidenebicyclo[2,2,1]hepta-2-ene; 6-methyl-5-ethylidenebicyclo[2,2,1]hepta-2-ene; 6-methyl-5-isopropylidenebicyclo[2,2,1]hepta-2-ene; 6-ethyl-5-ethylidenebicyclo[2,2,1]-hepta-2-ene; 5-ethylidenebicyclo[2,2,2]octane; 5-propylidenebicyclo[2,2,2]octane; 5-isopropylidenebicyclo[2,2,2]octane; 5-butylidenebicyclo[2,2,2]octane; 6-methyl-5-ethylidenebicyclo[2,2,2]octane; 6-methyl-5-isopropylidenebicyclo[2,2,2]octane; 5-ethylidenebicyclo[2,2,2]octa-2-ene; 5-propylidenebicyclo[2,2,2]-octa-2-ene; 5-isopropylidenebicyclo[2,2,2]octa-2-ene; 5-butylidenebicyclo[2,2,2]octa-2-ene; 5-(2'-methylpropylidene)-bicyclo[2,2,2]octa-2-ene; 6-methyl-5-ethylidenebicyclo[2,2,2]octa-2-ene; 6-methyl-5-isopropylidenebicyclo[2,2,2]octa-2-ene, etc.

These compounds [II] are utilizable as the starting materials in the production of various per se useful industrial products including synthetic rubber. Among them, alkylidenebicyclo[2,2,1]hepta-2-enes are particularly useful as the third components in the synthesis of ethylene-propylene-diene monomer (EPDM).

Practical and presently preferred embodiments of the invention are shown in the following Examples.

EXAMPLE 1

A. In a 100 ml flask, activated alumina (50 g) was charged and stirred at 380° to 400°C for 2 hours in a nitrogen stream. Sodium hydroxide (8.7 g) was portionwise added thereto at the same temperature, and the resultant mixture was stirred for 20 minutes. Then, metallic sodium (0.9 g) was portionwise added thereto, whereby the mixture became black but turned gradually white. After being stirred for 2 hours, the reaction mixture was allowed to cool to give a catalyst product. The product was not ignited on exposure to air, and the generation of hydrogen was not seen on its admixture with water.

B. In a 30 ml flask, 5-vinylbicyclo[2,2,1]hepta-2-ene (10 g) was charged, and the catalyst (1.95 g) obtained in the above (A) was added thereto under nitrogen. The resultant mixture was stirred at room temperature. After 10 and 30 minutes, the gas chromatographic analysis of the reaction mixture was performed. The results are shown in Table 1.

Table 1

| Time (min.) | Starting compound (%) 5-Vinylbicyclo[2,2,1]-hepta-2-ene | Product (%) 5-Ethylidenebicyclo-[2,2,1]hepta-2-ene |
| --- | --- | --- |
| 0 | 100 | 0 |
| 10 | 63.6 | 36.4 |
| 30 | 0 | 100 |

After the catalyst was removed by filtration, the filtrate was distilled to give 5-ethylidenebicyclo[2,2,1]-hepta-2-ene (9.9 g). B.P., 67° to 68°C/50 mmHg.

C. In a 35 ml flask, endo-5-isopropenylbicyclo[2,2,1]-hepta-2-ene (8.05 g) was charged, and the catalyst (1.0g) obtained in the above (A) was added thereto under nitrogen. The resultant mixture was stirred at room temperature. After 10 minutes, the completion of isomerization was confirmed by the gas chromatographic analysis of the reaction mixture. The reaction mixture was filtered so as to eliminate the catalyst, and the filtrate was distilled to give 5-isopropylidenebicyclo[2,2,1]hepta-2-ene (8.0 g). B.P., 58° to 59°C/18 mmHg. $n_D^{19.6}$, 1.4943.

D. In a 35 ml flask, exo-5-isopropenylbicyclo[2,2,1]-hepta-2-ene (8.0 g) was charged, and the catalyst (1.0 g) obtained in the above (A) was added thereto under nitrogen. The resultant mixture was stirred at room temperature. After 10 minutes, the completion of isomerization was confirmed by the gas chromatographic analysis of the reaction mixture. The reaction mixture was filtered so as to eliminate the catalyst, and the filtrate was distilled to give 5-isopropylidenebicyclo[2,2,1]hepta-2-ene (8.0 g).

E. A mixture comprising 59.0 % of endo-5-isopropenylbicyclo-[2,2,1]hepta-2-ene (hereinafter referred to as "n-IPN"), 18.4 % of exo-5-isopropenylbicyclo[2,2,1]hepta-2-ene (hereinafter referred to as "x-IPN"), 21.4 % of 5-isopropylidenebicyclo[2,2,1]hepta-2-ene (hereinafter referred to as "IPDN") and 1.1 % of isopropenylnortricyclene (hereinafter referred to as "IPNT") (8.0 g) was subjected to isomerization as in the above (C). After 10 and 15 minutes, the gas chromatographic analysis of the reaction mixture was performed. The results are shown in Table 2.

Table 2

| Time (min.) | n-IPN (%) | x-IPN (%) | IPDN (%) | IPNT (%) |
| --- | --- | --- | --- | --- |
| 0 | 59.0 | 18.4 | 21.4 | 1.1 |
| 10 | 2.4 | 1.5 | 95.0 | 1.1 |
| 15 | 0 | 0 | 98.8 | 1.2 |

F. A mixture comprising 4.9% of n-IPN, 76.2% of x-IPN, 17.1% of IPDN and 1.7% of IPNT (8.0 g) was subjected to isomerization as in above (C). After 15 minutes, the gas chromatographic analysis of the reaction mixture was performed. The results are shown in Table 3.

Table 3

| Time (min.) | n-IPN (%) | x-IPN (%) | IPDN (%) | IPNT (%) |
| --- | --- | --- | --- | --- |
| 0 | 4.9 | 76.2 | 17.1 | 1.7 |
| 15 | 0 | 0 | 98.0 | 2.0 |

G. In a 35 ml flask, 6-methyl-5-vinyl-bicyclo[2,2,1]-hepta-2-ene (14.0 g) was charged, and the catalyst (1.5 g) obtained in the above (A) was added thereto under nitrogen. The resultant mixture was stirred at 50° to 60°C. After 15 and 30 minutes, the gas chromatographic analysis of the reaction mixture was performed. The results are shown in Table 4.

Table 4

| Time (min.) | Starting compound (%) 6-Methyl-5-vinylbicyclo-[2,2,1]hepta-2-ene | Product (%) 6-Methyl-5-ethylidene-bicyclo[2,2,1]hepta-2-ene |
| --- | --- | --- |
| 0 | 100 | 0 |
| 15 | 42.5 | 57.5 |
| 30 | 1.4 | 98.6 |

After 120 minutes, the isomerization was completed, and the reaction mixture was filtered so as to eliminate the catalyst. The filtrate was distilled under reduced pressure to give 6-methyl-5-ethylidenebicyclo[2,2,1]-hepta-2-ene (13.7g). B.P., 78°C/50 mmHg. $n_D^{25.4}$, 1.4890.

H. In a 25 ml flask, 5-vinylbicyclo[2,2,2]octa-2-ene (1.7 g) was charged, and the catalyst (0.3 g) obtained in the above (A) was added thereto under nitrogen. The resultant mixture was stirred at room temperature. After 30, 60 and 90 minutes, the gas chromatographic analysis of the reaction mixture was performed. The results are shown in Table 5.

Table 5

| Time (min.) | Starting compound (%) 5-Vinylbicyclo[2,2,2]-octa-2-ene | Product (%) 5-Ethylidenebicyclo[2,2,2]-octa-2-ene |
| --- | --- | --- |
| 30 | 35.8 | 64.2 |
| 60 | 8.2 | 91.8 |
| 90 | 0.8 | 99.2 |

After 140 minutes, the isomerization was completed, and the reaction mixture was filtered so as to eliminate the catalyst. The filtrate was distilled under reduced pressure to give 5-ethylidenebicyclo[2,2,2]octa-2-ene (1.5 g). B.P., 71° to 72°C/22 mmHg. $n_D^{25}$, 1.4995.

I. In a 25 ml flask, 2-isopropenylbicyclo[2,2,1]-heptane (2.7 g) was charged, and the catalyst (0.5 g) obtained in the above (A) was added thereto under nitrogen. The resultant mixture was stirred at room temperature. After 30 minutes, the isomerization was completed, and the reaction mixture was filtered so as to eliminate the catalyst. The filtrate was distilled under reduced pressure to give 2-isopropylidenebicyclo[2,2,2]heptane (2.4 g). B.P., 61°C/16 mmHg. $n_D^{25.3}$, 1.4800.

J. In a reactor of 10 mm in inner diameter and 300 mm in length, the catalyst (10.0 g) obtained in the above (A) was charged in a nitrogen atmosphere, and 5-isopropenylbicyclo-[2,2,1]hepta-2-ene dropped from the top of the reactor at a rate of 1.1 g/min. and the product was collected from the bottom. No depression in the catalytic activity was seen after the feeding of the starting compound (300 g). The gas chromatographic analysis of the product revealed the presence of 5-isopropylidenebicyclo[2,2,1]hepta-2-ene in 99.8 %. No purification was necessary.

EXAMPLE 2

A. In a 100 ml flask, activated alumina (50 g) was charged and stirred at 350° to 400°C for 2 hours in a nitrogen stream. Sodium hydroxide (5.0 g) was portionwise added thereto at the same temperature over 40 minutes, and the resultant mixture was stirred for 20 minutes. Then, metallic sodium (1.8 g) was added thereto at 380° to 400°C, and stirring was continued for 2 hours. The reaction mixture was allowed to cool to give a catalyst product.

B. In the same manner as in Example 1 (B), the isomerization of 5-vinylbicyclo[2,2,1]hepta-2-ene (10.0 g) was executed by the use of the catalyst (1.9 g) obtained in the above (A). After 10 minutes, the isomerization was completed. Distillation of the reaction products gave 5-ethylidenebicyclo[2,2,1]hepta-2-ene (9.8g).

EXAMPLE 3

A. In a 100 ml flask, activated alumina (50 g) was charged and stirred at 400° to 420°C for 2.5 hours in a nitrogen stream. Sodium hydroxide (8.7 g.) was portionwise added thereto at the same temperature, and the resultant mixture was stirred for 70 minutes. Then, fragments of metallic potassium (1.5 g) were added thereto over 10 minutes, whereby the mixture became violet but gradually turned white in about 15 minutes. After being stirred for 2 hours, the reaction mixture was allowed to cool to give a catalyst product.

B. In a 25 ml flask, 5-vinylbicyclo[2,2,1]hepta-2-ene (5.0 g) was charged, and the catalyst (1.0 g) obtained in the above (A) was added thereto under nitrogen. The resultant mixture was stirred at room temperature. After 30 minutes, the gas chromatographic analysis of the reaction mixture revealed the presence of 5-ethylidenebicyclo[2,2,1]hepta-2-ene in the amount of 50.9% and the starting compound in the amount of 49.1%.

EXAMPLE 4

A. In a 100 ml flask, activated alumina (50 g) was charged and stirred at 400° to 420°C for 1.5 hours. Potassium hydroxide (85%; 12.2 g) was portionwise added thereto at the same temperature, and the resultant mixture was stirred for 40 minutes. Then, fragments of metallic potassium (1.5 g) were added thereto over 10 minutes, and stirring was continued for 2 hours at the same temperature. The reaction mixture was allowed to cool to give a catalyst product.

B. In a 25 ml flask, 5-vinylbicyclo[2,2,1]hepta-2-ene (5.0 g) was charged, and the catalyst (1.0 g) obtained in the above (A) was added thereto under nitrogen. The resultant mixture was stirred at room temperature. After 30 minutes, the gas chromatographic analysis of the reaction mixture revealed the presence of 5-ethylidenebicyclo[2,2,1]hepta-2-ene in the amount of 42.5% and the starting compound in the amount of 57.5%.

EXAMPLE 5

A. In a 100 ml flask, activated alumina (50 g) was charged, and a solution of sodium hydroxide (8.7 g) in water (40 ml) was added thereto. The resultant mixture was stirred and heated at 100° to 120°C so as to evaporate the water therefrom. After stirring at 400° to 420°C for 2 hours, metallic sodium (0.9 g) was added portionwise to the resulting mixture in a nitrogen stream. Stirring was continued for 2 hours, and the reaction mixture was allowed to cool to give a catalyst product. The product was white, and the generation of hydrogen was not seen on its admixture with water.

B. In a 25 ml flask, 5-vinylbicyclo[2,2,1]hepta-2-ene (5.0 g) was charged, and the catalyst (1.0 g) obtained in the above (A) was added thereto under nitrogen. The resultant mixture was stirred at room temperature. After 10 minutes, the gas chromatographic analysis of the reaction mixture revealed the presence of 5-ethylidenebicyclo[2,2,1]hepta-2-ene in the amount of 25.1 % and the starting compound in the amount of 74.9 %.

EXAMPLE 6

A. In a 100 ml flask, activated alumina (50 g) was charged and stirred at 400° to 420°C for 2 hours in a nitrogen stream. Sodium hydroxide (8.7 g) was portionwise added thereto at the same temperature, and the resultant mixture was stirred for 20 minutes. Then, metallic sodium (2.0 g) was portionwise added thereto, and stirring was continued for 60 minutes. The reaction mixture was allowed to cool to give a catalyst product. The product was colored grey or black due to the presence of unreacted metallic sodium.

B. In a 25 ml flask, 5-vinylbicyclo[2,2,1]hepta-2-ene (5.0 g) was charged and the catalyst (1.0 g) obtained in the above (A) was added thereto under nitrogen. The resultant mixture was stirred at room temperature. After 20 minutes, the gas chromatographic analysis of the reaction mixture revealed the presence of 5-ethylidenebicyclo[2,2,1]hepta-2-ene in the amount of 75.5 %.

EXAMPLE 7

A. In a 100 ml flask, alumina mainly consisting of the γ-type (water content, 6.0 %) (50 g) was charged and heated up to 200°C in a nitrogen stream while stirring. Fragments of metallic sodium (3.8 g) were added thereto at the same temperature over 20 minutes, and the resultant mixture was stirred for 1 hour. Then, the temperature was gradually raised up to 400°C, and fragments of metallic sodium (1.9 g) were added thereto over 10 minutes. Stirring was continued at the same temperature for 3.5 hours to give a catalyst product. The product was colored white, and the absence of metallic sodium was confirmed by X-ray diffractiometry.

B. In a 35 ml flask, 5-isopropenylbicyclo[2,2,1]-hepta-2-ene (endo type, 89.9 %; exo type, 10.1 %) (10.0 g) was charged, and the atmosphere was replaced by nitrogen. The catalyst obtained in the above (A) (1.2 g) was added thereto, and the resultant mixture was stirred at room temperature. After 30 minutes, the gas chromatographic analysis of the reaction mixture revealed the presence of 5-isopropylidenebicyclo[2,2,1]hepta-2-ene in the amount of 99.7 %. The catalyst was eliminated by filtration, and the filtrate was distilled to give 5-isopropylidenebicyclo[2,2,1]-hepta-2-ene (9.9 g). B.P., 90°C/60 mmHg. $n_D^{23}$, 1.4940.

EXAMPLE 8

A. In a 100 ml flask, alumina mainly consisting of $\chi$ and $\delta$ types (water content, 1.6 %) (50 g) was charged and heated up to 400°C in a nitrogen stream while stirring. Fragments of metallic potassium (1.8 g) were added thereto at the same temperature over 7 minutes, and the resultant mixture was stirred for 2 hours and allowed to cool to give a catalyst product. The product was colored greyish white, and the absence of metallic potassium was confirmed by X-ray diffractiometry.

B. In a 25 ml flask, 5-vinylbicyclo[2,2,1]hepta-2-ene (endo type, 75.0 %; exo type, 25.0 %) (5.0 g) was charged, and the atmosphere was replaced by nitrogen. The catalyst obtained in the above (A) (1.0 g) was added thereto, and the resultant mixture was stirred at room temperature. After 10 minutes, the gas chromatographic analysis of the reaction mixture revealed the presence of 5-ethylidenebicyclo[2,2,1]hepta-2-ene in the amount of 99.8 %. The catalyst was eliminated by filtration, and the filtrate was distilled to give 5-ethylidenebicyclo[2,2,1]hepta-2-ene (4.7 g). B.P., 67 to 68°C/50 mmHg. $n_D^{20}$, 1.4910.

EXAMPLE 9

A. In a 100 ml flask, γ-alumina containing 10 % of boehmite (50 g) was charged and heated up to 400°C in a nitrogen stream while stirring. Fragments of metallic sodium (1.9 g) were added thereto over 5 minutes, and the resultant mixture was stirred for 2 hours and allowed to cool to give a catalyst product.

B. In a 35 ml flask, exo-5-isopropenylbicyclo[2,2,1]-hepta-2-ene (10.0 g) was charged, and the atmosphere was replaced by nitrogen. The catalyst obtained in the above (A) (1.6g) was added thereto, and the resultant mixture was stirred at 50°C. After 30 minutes, the gas chromatographic analysis of the reaction mixture revealed the presence of the starting exo-5-isopropenylbicyclo[2,2,1]hepta-2-ene in the amount of 4.1 %, the produced 5-isopropylidenebicyclo[2,2,1-]hepta-2-ene in the amount of 94.3 % and the produced 1-isopropenylnortricyclene in the amount of 1.6 %. The reaction mixture was filtered to eliminate the catalyst and, the filtrate was distilled to give 5-isopropylidenebicyclo[2,2,1]-hepta-2-ene (9.8 g). B.P., 86 to 87°C/51 mmHg.

EXAMPLE 10

A. In a 100 ml flask, alumina mainly consisting of the $\chi$ and $\gamma$ types (water content, 2.0 %) (50 g) was charged and heated up to 400°C in a nitrogen stream while stirring. Fragments of metallic sodium (2.5 g) were added thereto at the same temperature over 5 minutes, and the resultant mixture was stirred for 2 hours and allowed to cool to give a catalyst product. The product showed therein black spots due to the partial presence of metallic sodium.

B. In a 25 ml flask, 5-vinylbicyclo[2,2,2]octa-2-ene (2.0 g) was charged, and the atmosphere was replaced by nitrogen. The catalyst obtained in the above (A) (0.25 g) was added thereto, and the resultant mixture was stirred at room temperature. After 120 minutes, the gas chromatographic analysis of the reaction mixture revealed the presence of 5-ethylidenebicyclo[2,2,-2]octa-2-ene in the amount of 98.6 %. The reaction mixture was filtered to eliminate the catalyst, and the filtrate was distilled under reduced pressure to give 5-ethylidenebicyclo[2,2,2]octa-2-ene (1.8 g). B.P., 72°C/22 mmHg. $n_D^{25}$, 1.4995.

EXAMPLE 11

A. In a 100 ml flask, alumina mainly consisting of the ρ type (water content, 8 %) (50 g) was charged and heated up to 300°C in a nitrogen stream while stirring. Metallic sodium (5.2 g) was portionwise added thereto at the same temperature over 15 minutes, and the resultant mixture was stirred for 1 hour. Then, the temperature was gradually raised up to 400°C, and metallic sodium (1.8 g) was added thereto over 5 minutes. Stirring was continued at the same temperature for 2 hours, and the reaction mixture was allowed to cool to give a catalyst product.

B. In a 25 ml flask, 2-isopropenylbicyclo[2,2,1]-heptane (3.0 g) was charged, and the atmosphere was replaced by nitrogen. The catalyst obtained in the above (A) (0.5 g) was added thereto, and the resultant mixture was stirred at room temperature. After 30 minutes, the completion of isomerization was confirmed by the gas chromatographic analysis of the reaction mixture. The catalyst was eliminated by filtration, and the filtrate was distilled to give 2-isopropylidenebicyclo[2,2,1]heptane (2.4 g). B.P., 61°C/16 mmHg. $n_D^{25.3}$, 1.4800.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for the production of alkylidene bridged ring compounds which comprises contacting an alkenyl bridged ring compound of the formula:

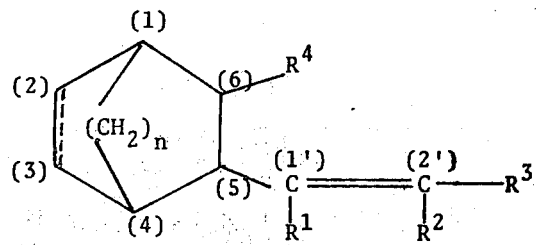

wherein $R^1$, $R^2$ and $R^3$ are each hydrogen or alkyl having 1 to 8 carbon atoms, $R^4$ is hydrogen or alkyl having 1 to 4 carbon atoms and $n$ is 1 or 2 and wherein a double bond may be present at the place between the 2- and 3-positions as indicated by the dotted line, with an alkaline catalyst composition prepared by heating alumina, from 0.01 to 100% by weight of the alumina of an alkali metal hydroxide and an equimolar or less amount with respect to the alkali metal hydroxide of an alkali metal at a temperature higher than the melting point of the alkali metal, whereby the resulting catalyst composition does not contain the alkali metal as a simple substance and consequently does not ignite on exposure to air and does not generate hydrogen on admixture with water, to give an alkylidene bridged ring compound of the formula:

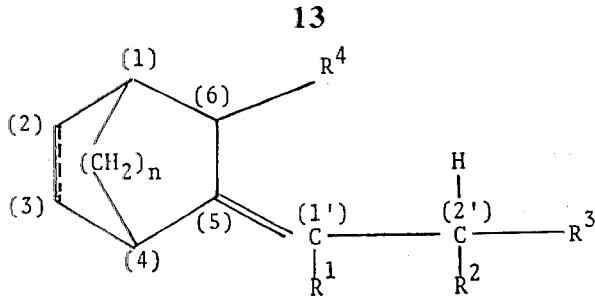

wherein $R^1$, $R^2$, $R^3$, $R^4$ and $n$ are each as defined above and wherein a double bond may be present at the place between the 2- and 3- positions as indicated by the dotted line.

2. The process according to claim 1, wherein the alkaline catalyst composition is used in an amount of 0.001 to 1 part by weight per 1 part by weight of the starting compound.

3. The process according to claim 2, wherein the contact is effected at room temperature.

4. The process according to claim 1, wherein the catalyst composition is prepared by heating at a temperature of from 200° to 500°C.

5. A process for the production of alkylidene bridged ring compounds which comprises contacting an alkenyl bridged ring compound of the formula:

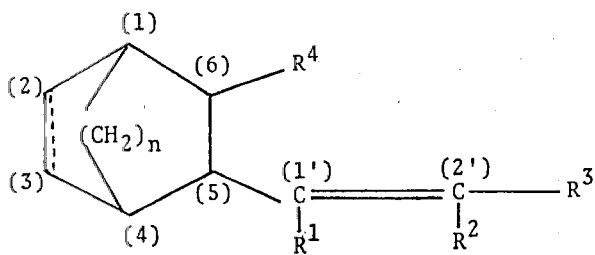

wherein $R^1$, $R^2$ and $R^3$ are each hydrogen or alkyl having 1 to 8 carbon atoms, $R^4$ is hydrogen or alkyl having 1 to 4 carbon atoms and $n$ is 1 or 2 and wherein a double bond may be present at the place between the 2- and 3-positions as indicated by the dotted line, with an alkaline catalyst composition prepared by heating an alkali metal and an alumina having water removable therefrom at a temperature higher than the melting point of the alkali metal, the alkali metal being used in an amount of 1.01 to 2 times that which can be consumed completely by the water in the alumina, whereby the resulting catalyst composition does not contain the alkali metal as a simple substance and consequently does not ignite on exposure to air and does not generate hydrogen on admixture with water to give an alkylidene bridged ring compound of the formula:

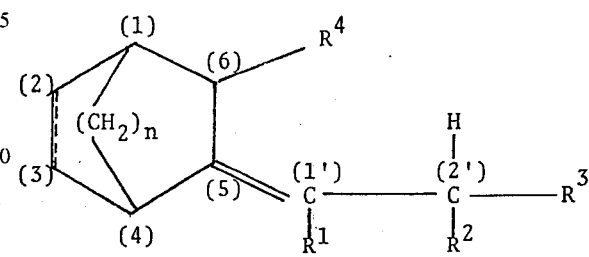

wherein $R^1$, $R^2$, $R^3$, $R^4$ and n are each as defined above and wherein a double bond may be present at the place between the 2- and 3-positions as indicated by the dotted line.

6. The process according to claim 5, wherein the catalyst composition is prepared by heating at a temperature of from 200° to 500°C.

7. The process according to claim 5, wherein the alumina contains removable water in the amount of 1.3 to 15% by weight.

8. The process according to claim 5, wherein the alkaline catalyst composition is used in an amount of 0.001 to 1 part by weight per 1 part by weight of the starting compound.

9. The process according to claim 5, wherein the contact is effected at room temperature.

* * * * *